US 6,460,765 B1

(12) United States Patent
Priesbsch (10) Patent No.: US 6,460,765 B1
(45) Date of Patent: Oct. 8, 2002

(54) LABEL SENSOR FOR SENSING EDGES OF LIGHT CONDUCTIVE LABELS

(75) Inventor: Hans-Dieter Priesbsch, Bissingen (DE)

(73) Assignee: Leuze electronic GmbH & Co., Owen/Teck (DE)

(*) Notice: Subject to any disclaimer, the term of this patent is extended or adjusted under 35 U.S.C. 154(b) by 0 days.

(21) Appl. No.: 09/403,067
(22) PCT Filed: Feb. 12, 1999
(86) PCT No.: PCT/EP99/00912
§ 371 (c)(1),
(2), (4) Date: Oct. 14, 1999
(87) PCT Pub. No.: WO99/41151
PCT Pub. Date: Aug. 19, 1999

(30) Foreign Application Priority Data

Feb. 14, 1998 (DE) .......................................... 198 06 124

(51) Int. Cl.$^7$ .............................. G06K 7/10; G06K 7/14
(52) U.S. Cl. ......................... 235/454; 235/440; 235/470
(58) Field of Search ................................. 235/454, 470, 235/435, 439, 440, 494, 490; 356/398; 250/227.25

(56) References Cited

U.S. PATENT DOCUMENTS

| 3,709,611 A | * | 1/1973 | Taisne ........................ 356/398 |
| 4,685,982 A | | 8/1987 | Kucheck ...................... 156/64 |
| 4,690,565 A | | 9/1987 | Kato et al. ................... 356/446 |
| 5,133,396 A | | 7/1992 | Selak et al. .................. 156/361 |
| 5,359,184 A | * | 10/1994 | Froehlich et al. ............ 235/454 |
| 5,760,384 A | * | 6/1998 | Itoh et al. ..................... 235/494 X |
| 6,307,198 B1 | * | 10/2001 | Asakura et al. ............... 250/227.25 |

FOREIGN PATENT DOCUMENTS

| DE | 7007 447 | | 7/1970 |
| DE | 2828103 A1 | | 1/1980 |
| DE | 3621 093 C1 | | 9/1987 |
| DE | 88 08 219 | | 8/1988 |
| DE | 195 21 129 C1 | | 10/1996 |
| JP | 2000-162325 A | * | 6/2000 |
| JP | 2000-266690 A | * | 9/2000 |

* cited by examiner

Primary Examiner—Michael G. Lee
Assistant Examiner—Jared J. Fureman
(74) Attorney, Agent, or Firm—Venable; Robert Kinberg (57) ABSTRACT

The invention relates to a sensor for the contactless scanning of labels, arranged on a support material which is moved relative to the sensor, the sensor including a transmitter arranged at a distance to the labels for emitting transmission light beams which penetrate at least partially the labels and the support material, and also comprising a receiving element, located opposite the transmitter and an evaluation unit for being coupled to at least the receiving element, wherein the receiving element comprises at least two receivers, wherein when the transmission light beams fully strike a label or the support material, the transmission light beams run between the receivers and when a portion of the transmission light beams is deflected at an edge of a label, and is conducted inside of said label, said portion strikes one of the receivers and is evaluated in the evaluation unit for detecting the edges.

34 Claims, 6 Drawing Sheets

LABEL SENSOR FOR SENSING EDGES OF LIGHT CONDUCTIVE LABELS

BACKGROUND OF THE INVENTION

The invention relates to a sensor for the contactless scanning of labels, which are arranged at a mutual distance to each other, one after another, on a support material and are moved relative to the sensor, so that the labels are scanned successively by the sensor.

A sensor of this type is known from the DE 195 21 129 C1. This sensor is designed as capacitive sensor with two side-by-side arranged capacitor elements. The capacitor elements have respectively one air gap, in which the support material with the labels is guided. The distance between the capacitor elements is smaller than the dimensions for the labels in scanning direction. A time function element that generates a pulse sequence and a low pass filter are connected downstream after each capacitor element. The time function elements are activated with a time offset by way of an oscillator. The low-pass filter outputs are conducted to a differential amplifier. The edges of the labels can be detected with the signals that are present at the output of the differential amplifier.

However, these signals cannot provide information on whether the end or the beginning of a label was detected.

Furthermore, it is a disadvantage that the signals from the capacitive sensor are highly susceptible to interference caused by external influences such as moisture and temperature.

SUMMARY OF THE INVENTION

It is the object of the invention to design a sensor of the aforementioned type, in such a way that the labels on the support material can be detected as reliably as possible.

This object is solved with a sensor comprising a transmitter arranged at a distance to the labels for emitting transmission light beams which penetrate at least partially the labels and the support material, the sensor also comprising a receiving element, located opposite the transmitter and an evaluation unit for being coupled to at least the receiving element, wherein the receiving element comprises at least two receivers, arranged evenly spaced one after another in a movement direction of labels, such that a beam axis for the transmission light beams runs between the receivers, wherein when the transmission light beams fully strike a label or the support material, the transmission light beams run between the receivers and when a portion of the transmission light beams is deflected at an edge of a label, and is conducted inside of said label, said portion strikes one of the receivers and is evaluated in the evaluation unit for detecting the edges. Advantageous embodiments and useful modifications of the invention will become apparent from the disclosure herein.

In accordance with the invention, the sensor is designed as optoelectronic sensor. Its transmitter is arranged at a distance to the labels, onto which the transmission light beams, emitted by the transmitter, are directed. In accordance with a first alternative of the invention, the sensor operates with the transmitted-light method. For this, transmission light beams that penetrate the labels strike a receiving element, which is arranged on the side of the labels that is located opposite the transmitter.

The receiving element has two receivers, arranged one after another at a distance to each other in movement direction of the labels, so that the beam axis runs between the labels.

With this sensor, it is possible to securely detect transparent labels, which are affixed to a transparent support material or, to a limited degree, to a non-transparent support material.

If the transmission light beams strike a label or the support material between labels with their complete beam diameter, they penetrate this level surface and run between the receivers, without impinging on these.

This is preferably achieved in that the transmission light beams strike the labels or the support material at a right angle.

If the transmission light beams strike the edge of a label, then some of the transmission light beams are absorbed into the label as a result of diffraction or light refraction and progresses inside the label as a result of multiple reflections at the label surfaces.

In the process, a portion of the transmission light beams exits from the label and strikes one of the receivers. The receiving signal recorded in the receiver is used to detect the label edge in the evaluation unit.

The transmitted light is respectively guided to a specified receiver only, depending on whether the beginning or the end of a label is detected. Thus, by determining at which receiver the receiving signal is present, it is possible to determine whether the beginning or the end of a label was detected.

The use of an optical sensor is particularly advantageous since this sensor is insensitive against the effects of temperature and moisture.

The optical sensor has the additional advantage that the distance between transmitter and receiving element can be selected to be relatively large, which facilitates a handling of the sensor.

A second alternative of the invention provides that the transmitter and receiver are arranged on the same side of the support material with the labels. For this, the receivers are arranged in movement direction of the labels, on both sides of the transmitter. In this case, the light that is diffracted or refracted at the label edge is then introduced into the label. The respective receiver then detects the portion of the light that exits at the boundary layer of the label as a result of the multiple reflection.

One particularly advantageous embodiment of the invention provides for a third receiver, which is arranged in the beam axis for the transmission light beams, between the two first receivers. Non-transparent labels and support materials, such as paper, can be detected with this receiver.

BRIEF DESCRIPTION OF THE DRAWINGS

FIG. 1: A schematic representation of the design for a first embodiment of the sensor for scanning labels,
 a) at a first point in time $t_1$,
 b) at a second point in time $t_2$.

FIG. 2: A schematic representation of the design for a second embodiment of the sensor for scanning labels,
 a) at a first point in time $t_1$,
 b) at a second point in time $t_2$.

FIG. 6: The chronological course of the differences D and −D of the receiving signals for the signal evaluation according to FIG. 4,
 a) with the transmission light beams focused on a front edge of the label,
 b) with the transmission light beams focused on the back edge of the label.

DETAILED DESCRIPTION OF THE INVENTION

Figure 1A:
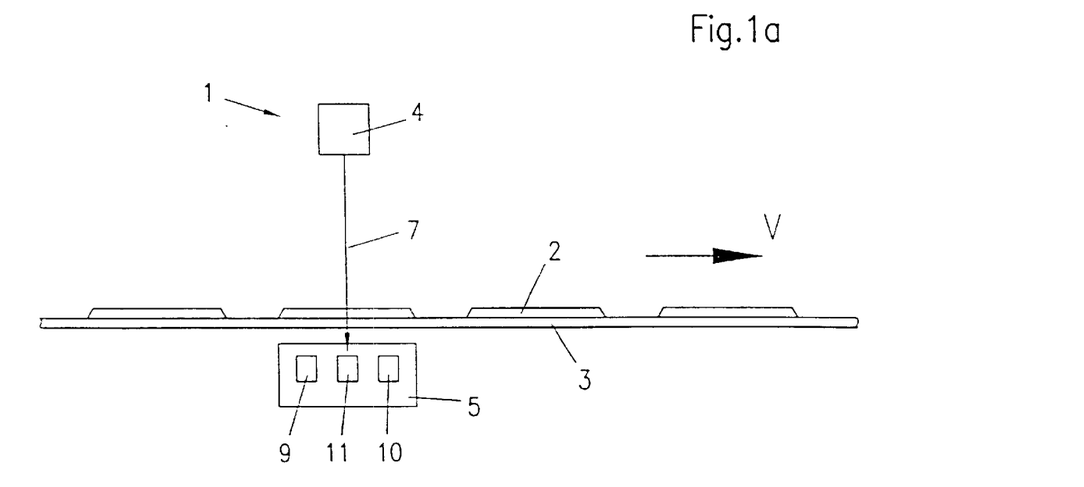
Figure 1B:
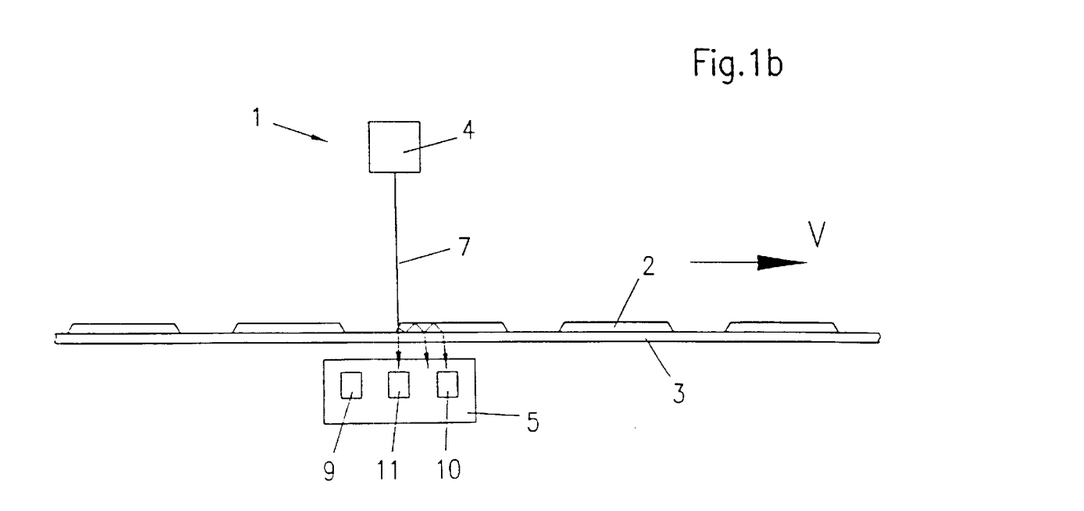

The FIGS. 1a and 1b show the design for a first exemplary embodiment of an optoelectronic sensor 1 for scanning labels 2, which are arranged on a support material 3. The support material 3 with labels 2 is moved at a predetermined speed v in a specified direction. The labels 2 preferably have a rectangular cross section and are arranged successively in movement direction of the support material 3, respectively at a distance to each other. It makes sense if the labels 2 are glued to the support material 3.

The optoeletronic sensor 1 comprises a transmitter 4 and a receiving element 5, which are connected to a joint evaluation unit 6.

As shown in FIGS. 1a and 1b, the transmitter 4 is arranged above the support material 3 with the labels 2. The transmission light beams 7, emitted by the transmitter 4, strike this material at a right angle.

The sensor 1 operates with the transmitted-light method. The receiving element 5 is arranged below the support material 3, in the beam axis for the transmission light beams 7.

It makes sense if the transmitter 4 and the receiving elements 5 are integrated into a joint housing, which is not shown here. The housing in this case has a fork-shaped design, wherein the transmitter 4 and the receiving element 5 are arranged on opposite sides, respectively in one of the legs of the fork-shaped housing. The support material 3 with the labels 2 is guided in the air gap between the legs of the housing.

The transmitter 4 is designed as a laser diode with a downstream-connected transmitting optic, which is not shown here. A transmitter driver 8 actuates the transmitter 4. The transmission light beams 7, emitted by the transmitter 4, are focused onto the plane in which the support material 3 with labels 2 is guided. As a result of this, an extremely small transmission light spot is obtained at the scanning location. It is advantageous if the diameter of the transmission light beams 7 is small enough, so that it is concentrated with the highest possible precision onto the transition region between label 2 and support material 3.

The receiving element 5 comprises several receivers 9, 10, 11, which are respectively formed by a photodiode.

Two first receivers 9, 10 are arranged at a distance to each other in movement direction of the labels 2, such that the beam axis for the transmission light beams 7 runs between the receivers 9, 10. The receivers 9, 10 in this case are arranged symmetrical to the beam axis of the transmission light beams 7.

The distance between these receivers 9, 10 is much greater than the diameter of the transmission light beams 7 and smaller than the distance between two neighboring labels 2.

A third receiver 11 is arranged between the first two receivers 9, 10 on the beam axis for the transmission light beams 7.

Figure 3:
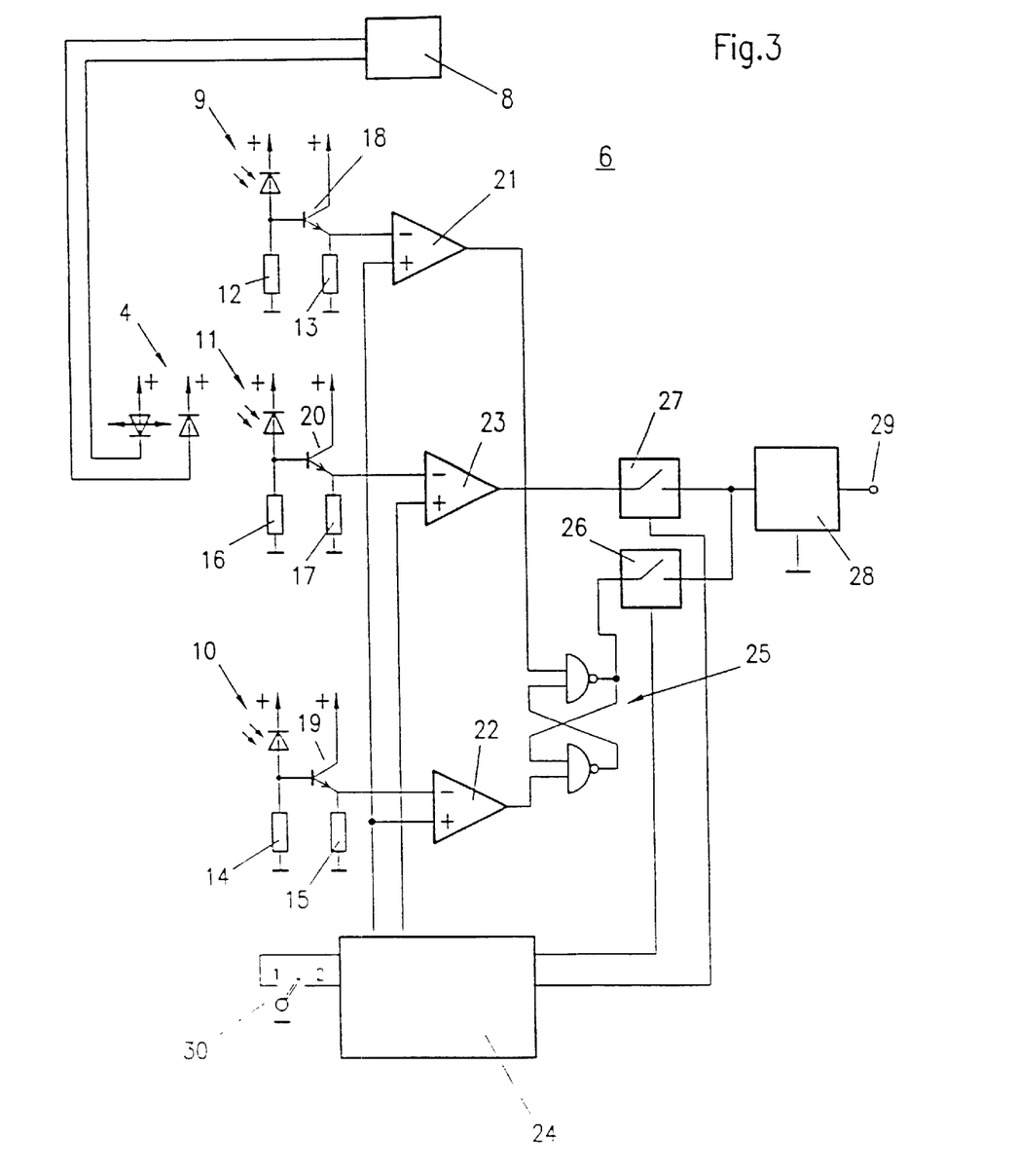
FIG. 3: A block diagram of a first embodiment of the evaluation unit for the sensor according to the FIGS. 1 and 2.

The receiving signals for receivers 9, 10, and 11 are evaluated in the evaluation unit 6. A first exemplary embodiment is shown in FIG. 3. The receiving signals present at the outputs of the receivers 9, 10, 11 are transmitted to a comparator 21, 22, 23, respectively via resistors 12, 13, 14, 15, 16, 17 and a transistor 18, 19, 20. The comparative voltages of comparators 21, 22, 23, which form the threshold values, are predetermined application-specific with a computer unit 24.

The outputs of the comparators 21, 22, which are connected downstream of the two first receivers 9, 10, are conducted to a flip-flop 25. The outputs of this flip-flop are connected via feed lines to a first switch 26. The output of the comparator 23, which is connected downstream of the third receiver 11, is conducted to a second switch 27. The outputs of switches 27 are connected via a short-circuit-resistant buffer 28 to the signal output 29 of sensor 1.

The switches 26, 27 can be actuated selectively by way of a teach-in key 30, which is connected to the computer unit 24.

Depending on whether the first switch 26 or the second switch 27 is actuated, only the receiving signals from the first two receivers 9, 10 or the receiving signals from the third receiver 11 are evaluated in the evaluation unit 6.

Given the case that the sensor 1 must detect transparent labels 2, which are glued onto an equally transparent support material 3, as shown in FIGS. 1a and 1b, the first switch 26 is actuated, so that only the signals received by the first two receivers 9, 10 are evaluated.

If the transmission light beams 7 fully strike the support material 3 between two labels 2 or, as shown in FIG. 1a, fully strike a label 2, then the transmission light beams 7 strike a level object surface. The transmission light beams 7 consequently penetrate the label 2 and/or the support material 3 in perpendicular direction, without a beam deflection occurring on the inside of label 2 and/or the support material 3. As a result, the transmission light beams 7 are conducted fully onto the third receiver 11. In the ideal case, no receiving signal is recorded at the first two receivers 9, 10. In any case, the receiving signal levels for the receivers 9, 10 are below the respective threshold value.

A different picture results if the transmission light beams 7 strike a label edge. In FIG. 1b, the transmission light beams 7 strike the edge forming the end of label 2. If the edge were to extend in precisely perpendicular direction, parallel to the transmission light beams 7, then a beam deflection would not occur at the edge of label 2, so that the full amount of transmitted light would strike the third receiver 11.

However, such an ideal edge does not occur in practical operations. Parts of the edge are at an angle relative to the beam axis for the transmission light beams 7, at least in some sections or segments. This is caused by irregularities during the production process of the labels 2, particularly during the cutting or punching out of the labels 2. Additional non-homogeneous areas occur as a result of the adhesive used to glue the labels 2 onto the support material 3.

A portion of the transmission light beams 7 is therefore refracted at the edge of label 2 and progresses inside the label 2.

The greater the non-homogeneous areas along the edges and the more exact the diameter of the transmission light beams 7 that is focused onto the edge of label 2, the higher the share of the transmission light beams 7 that is coupled into the label 2. A multiple reflection of the transmission light beams 7 occurs at the boundary surfaces for the label 2.

With each reflection of the transmission light beams 7 at the boundary surface of label 2, a portion of the transmission light beams 7 also exits from the label 2. FIG. 1b shows this case for the reflection occurring at the lower boundary surface of label 2. A portion of the transmission light beams 7 that exit at the lower boundary surface of label penetrates the support material 3 and strikes second receiver 10, arranged underneath. Since the transmission light beams 7 are focused onto the end of label 2, the light-conducting effect within the label 2 occurs only in the direction of the second receiver 10, but not in the direction of the first receiver 9. Correspondingly, the receiving signal from the first receiver 9 is located below the threshold value, while the receiving signal from the second receiver 10 is located above the threshold value. The reverse signal conditions result when detecting the beginning of the label 2. In this case, the threshold values are selected application-specific and material-dependent, such that the amounts of transmitted light conducted onto the first two receivers 9, 10 as a result of the light conducting effects can be detected with certainty. It must be viewed as a special advantage that a secure edge detection is ensured, regardless of whether the labels 2 are printed on or not.

Figure 4:
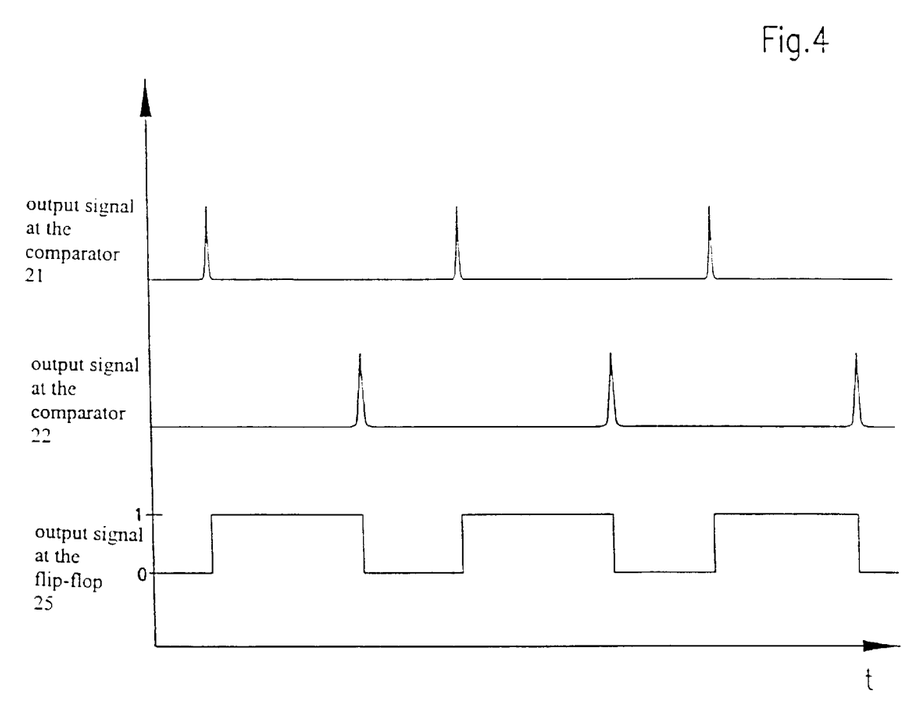
FIG. 4: A pulse diagram of the receiving signals, which are processed in the evaluation unit.

FIG. 4 shows the signal evaluation. As a result of detecting the beginning of the label 2, the receiving signal from the first receiver 9 briefly exceeds the threshold value at the comparator 21. Accordingly, the signal sequence shown in FIG. 3 results for the output signal of comparator 21, wherein each signal pulse corresponds to the detection of the periphery of a label 2.

Accordingly, the receiving signal from the second receiver 10 briefly exceeds the threshold value at the comparator 22 during the detection of the end of the label 2. As a result, the output signal shown in FIG. 3 is obtained at their output.

The signals at the outputs of comparators 21, 22 are combined in the flip-flop 25. The signal course shown in the lower third of FIG. 3 is subsequently obtained at the output of this flip-flop. The signal value 0 is obtained if the transmission light beams 7 are focused onto the support material 3 between the labels 2. The signal value 1 is obtained if the transmission light beams 7 are focused onto a label 2. This signal sequence is present at the signal output 29 of sensor 1.

In the event that non-transparent labels 2 on non-transparent support material 3, e.g. consisting of paper, must be detected with the sensor 1, only the third receiver 11 is activated via the teach-in key 30. The threshold value of the comparator 23 at the output for the third receiver 11 is selected such that the receiving signal of the third receiver 11 is above the threshold value if the transmission light beams 7 are focused onto the support material 3. If the transmission light beams 7 strike the label 2, they must penetrate a thicker layer of material, so that only a small amount of light still strikes the third receiver 11. As a result, the receiving signal is below the threshold value. An imprinting of the labels 2 does not lower a secure detection and actually increases it because the amount of light that strikes the third receiver 11 is decreased even further by the imprinting. It makes sense if the threshold value is selected application-specific in this case as well.

Figure 2A:
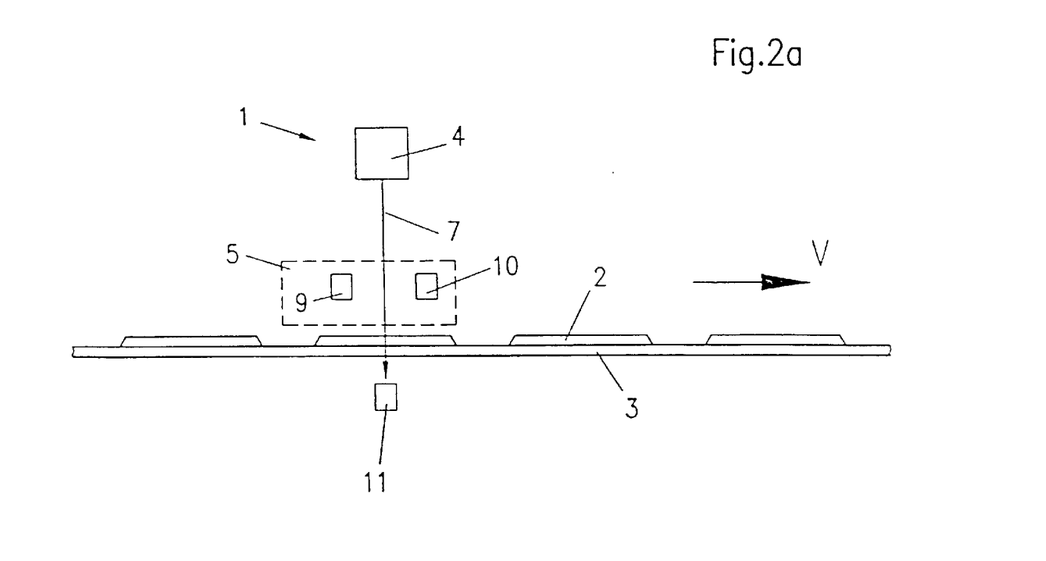
Figure 2B:
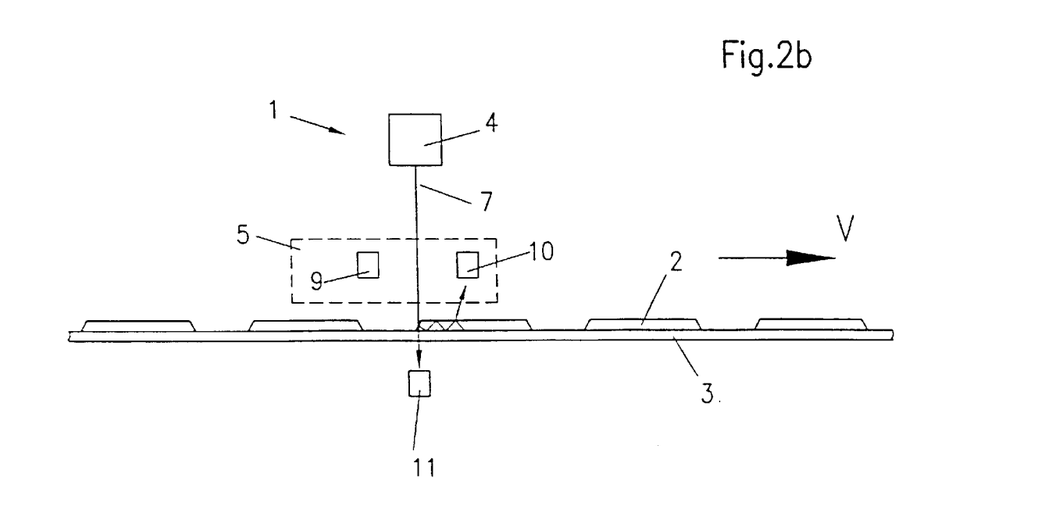

The FIGS. 2a and 2b show a second exemplary embodiment of the optoelectronic sensor 1. The design of this sensor 1 differs from the design of sensor 1 shown in FIGS. 1a and 1b, in that the receivers 9 and 10 are arranged on the same side as the transmitter 4, on the support material 3 with labels 2, while the receiver 11 continues to be arranged on the opposite side of the support material 3. The receivers 9, 10, 11 in turn form the receiving element 5.

The receivers 9, 10 are arranged on both sides of transmitter 4, in movement direction of labels 2. In this case, the distances between receivers 9, 10 correspond to the distances for the embodiment shown in FIGS. 1a and 1b. Otherwise, the design of sensor 1 also corresponds to the design of the sensor 1 shown in FIGS. 1a and 1b.

If the transmission light beams 7 fully strike the support material 3 between the labels 2 or, as shown in FIG. 2a, fully strike a label 2, then the transmission light beams 7 strike a level object surface. As a result, at least a portion of the transmission light beams 7 penetrates the label 2 and/or the support material 3 in perpendicular direction, without a beam deflection occurring inside the label 2 and/or the support material 3. The receivers 9, 10 are furthermore always arranged at a distance to the transmitter 4, which is selected such that no transmitted light or almost no transmitted light is reflected back to the receivers 9, 10 by the support material 3 and/or the labels 2.

However, if the transmission light beams 7 strike an edge of the label 2, as shown in FIG. 2b, then a portion of the transmission light beams 7 progresses inside the label 2 and is reflected back to the receiver 10, which is arranged above this label 2.

Figure 5:
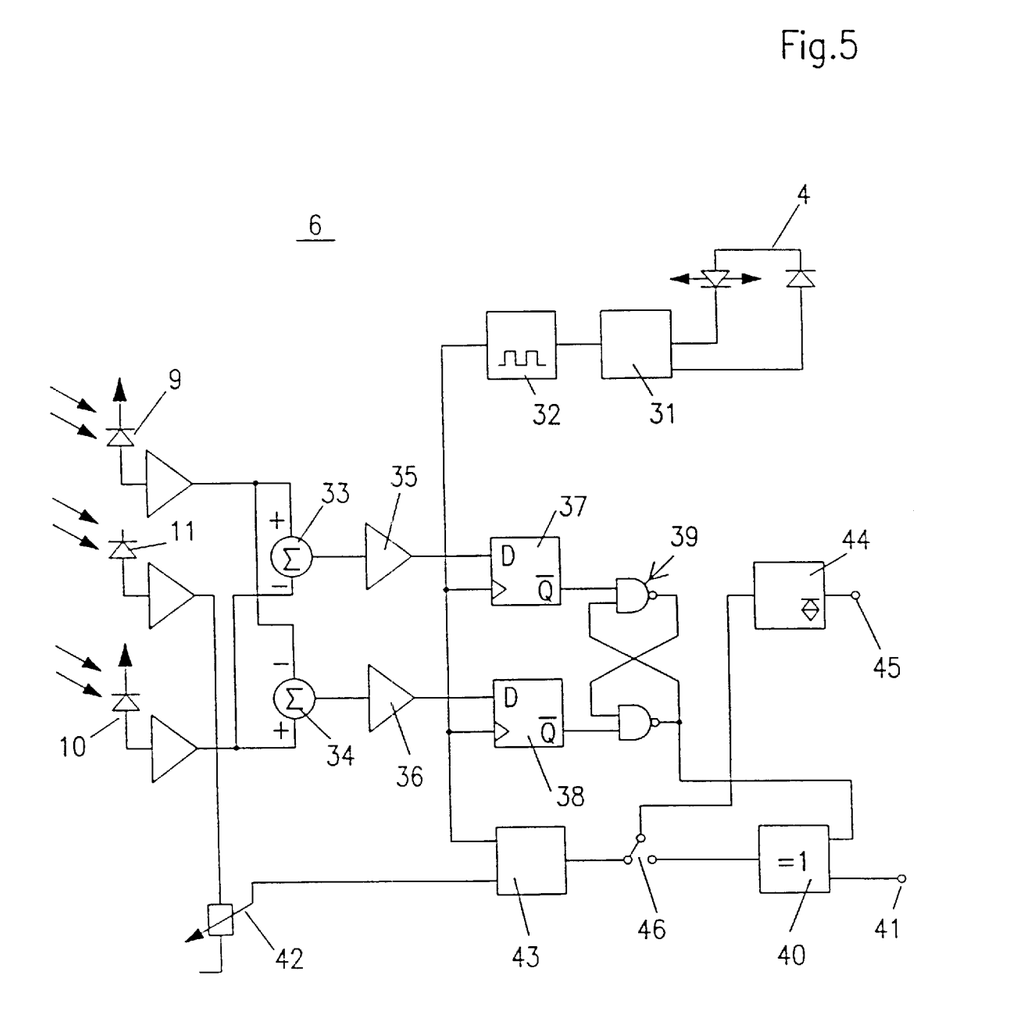
FIG. 5: A block diagram of a second embodiment of the evaluation unit for the sensor according to the FIGS. 1 and 2.

The evaluation of the receiving signals from the receivers 9, 10, 11 can again occur in the evaluation unit 6 and according to FIG. 3. The evaluation unit 6 shown in FIG. 5 is used for the evaluation of the present exemplary embodiment. This evaluation unit 6 can also be used for the sensor 1 shown in FIGS. 1a and 1b.

For the evaluation unit 6 shown in FIG. 5, the transmitter 4, which is realized as laser diode and is connected to a laser driver 31 and a pulse generator 32, is operated in the pulsed mode.

The receiving signals present at the outputs of receivers 9, 10 are transmitted to a first differential amplifier 33, in which the difference D between the receiving signals from the receiver 9 and 10 is formed. In addition, the receiving signals from the receivers 9, 10 are transmitted to a second differential amplifier 34, where the difference –D with reversed sign is formed.

Each differential amplifier 33, 34 is connected to an amplifier 35, 36 and a downstream-arranged flip-flop 37, 38. The outputs of these flip-flops 37, 38 are connected to another flip-flop 39, having an output that is connected to a first signal output 41 by way of an exclusive-OR element 40.

The receiving signals at the output for the third receiver 11 are conducted via an adjustable resistance element 42 to a comparator 43 with integrated evaluation circuit. In addition, a feed line from the pulse generator 32 is also conducted to an input of this comparator 43. A feed line leads from the output of this comparator 43, via an output amplifier 44, to a second signal output 45. With the evaluation unit 6 shown in FIG. 5, a switch 46 is installed upstream of the signal outputs 41, 45. Depending on the position of switch 46, only the receiving signals from the first two receivers 9, 10 or the receiving signals from the third receiver 11 are evaluated in the evaluation unit 6. Analog to the exemplary embodiment according to FIG. 3, the switch 46 can be actuated by means of a teach-in key that is not shown here.

Figure 6A:
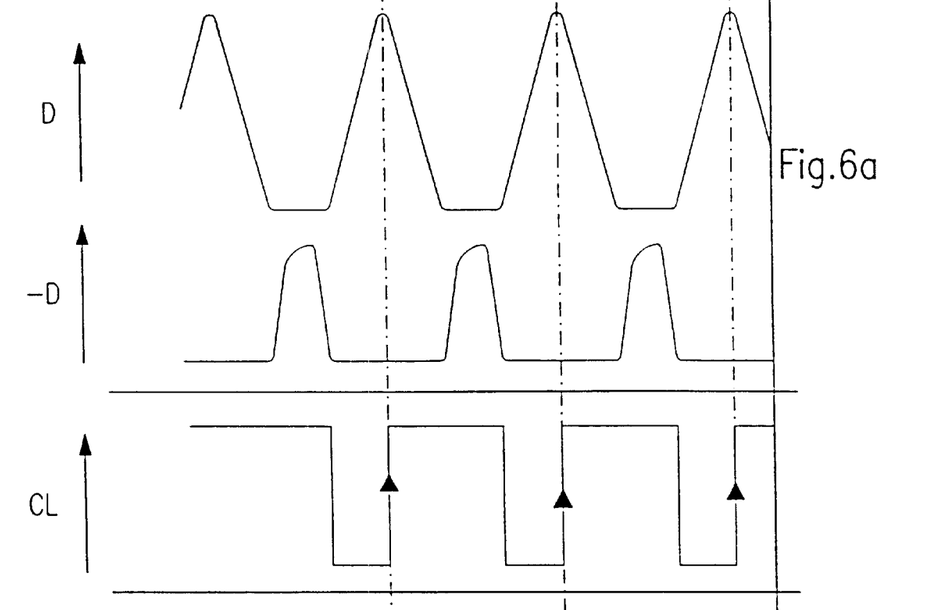
Figure 6B:
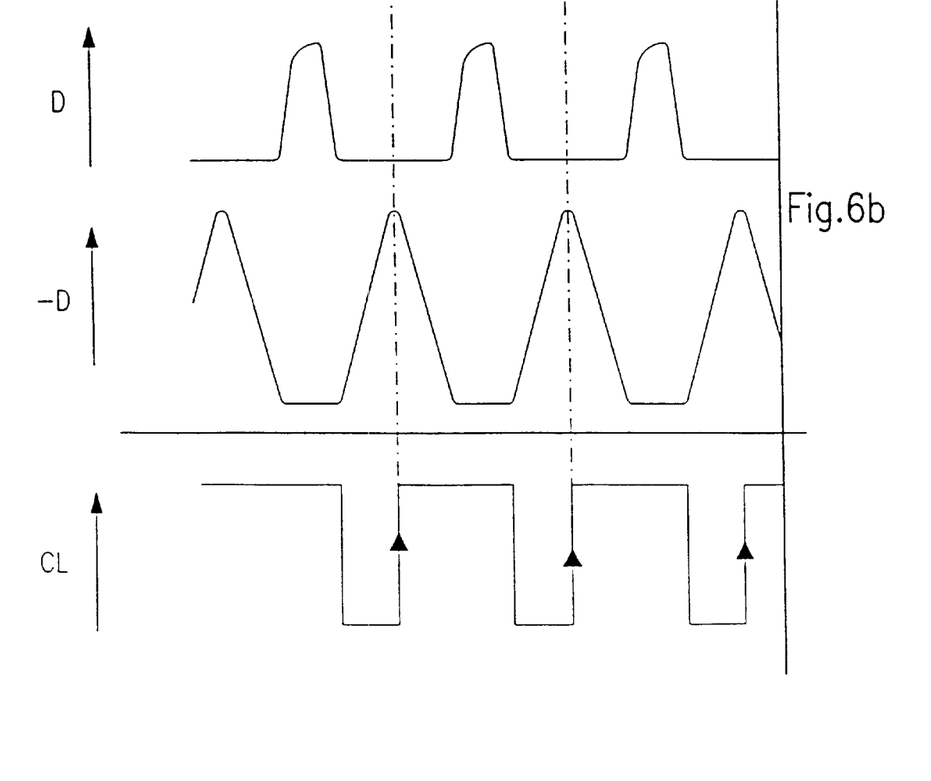

The FIGS. 6a and 6b illustrate the mode of operation of the evaluation unit 6, shown in FIG. 5. If the transmission light beams 7 fully strike the support material 3 between two labels 2, or fully strike a label 2, then the transmission light beams 7 penetrate the support material 3 and/or the label 2, without any transmitted light reaching the transmitters 9 and 10. Accordingly, the signal value zero is always obtained at the outputs of the differential amplifiers 33, 34 in those cases.

FIG. 6a shows the output signals D and –D at the first and second differential amplifier 33, 34 when the transmission light beams 7 strike the front edge of a label 2. In that case, a portion of the transmission light beams 7 progresses inside the label 2 and is reflected back by the receiver 9. In contrast, no transmitted light is reflected back to the receiver 10.

As shown in FIG. 6a, a signal value other than zero consequently results at the outputs of differential amplifiers 33, 34 for the signals D and –D. The signals D and –D in this case represent pulse sequences, for which the pulse sequence frequency corresponds to that of the transmitter 4. The clock signal Cl of pulse generator 32, which predetermines the pulse frequency of transmitter 4, is also shown in FIG. 6a. The signals D and –D in this case vary in time with the clock signal Cl.

The maximum values for the signal sequence D at the output of the first differential amplifier 33 coincide in time with the minimum values of the signal sequence –D at the output of the second differential amplifier 34. However, the signal sequences of D and –D in this case are not completely symmetrical. This is due to the fact that the level limits for the positive and the negative signal shares of the signal sequences D and –D are not selected symmetrical. The signal sequence lengths for D and –D are essentially determined by the length of time the transmission light beams 7 remain on the edge of the label 2.

FIG. 6b shows the output signals D and –D at the first and second differential amplifier 34 when the transmission light beams 7 strike the rear edge of a label 2. In that case, a portion of the transmission light beams 7 proceeds inside the label 2 and is reflected back to the receiver 10. In contrast, no transmitted light is reflected back to the receiver 9.

As shown in FIG. 6b, the signal sequences D and –D, are consequently obtained at the outputs of the differential amplifiers 33, 34.

A compared to the signal sequence D and –D, shown in FIG. 6a, the signal values for the signal sequences D and –D in FIG. 6b are reversed, owing to the fact that during the detection of the front edge of label 2 only the receiver 9 receives light and during the detection of the rear edge of label 2 only the receiver 10 receives light.

On the basis of this difference in the signal sequences D and –D during the detection of the front edge and the rear edge of label 2, it is possible to detect the beginning and the end of a label 2 with the aid of the circuit arrangement, which is installed downstream of the differential amplifiers 33, 34. For this, the signal sequences D and –D are evaluated in the flip-flop 39 by means of a threshold value and are then transmitted to the exclusive-OR element 40. As a result of this, a binary signal sequence is generated that is identical to the signal sequence shown in FIG. 4 and is conducted to the signal output 41. The signal value 0 is obtained if the transmission light beams 7 are focused onto the support material 3 between the labels 2. The signal value 1 is obtained if the transmission light beams 7 are focused onto a label 2. The transition from signal value 0 to 1 is detected when a front edge of the label 2 is detected. This transition preferably occurs at the point where the signal sequence D first exceeds the threshold value predetermined by the flip-flop 39.

The transition of the signal value at the output 41 from 1 to 0 occurs in the same way, as soon as the signal sequence –D first exceeds the threshold value of the flip-flop 39.

What is claimed is:

1. A sensor for the contactless scanning of labels, which are arranged at a mutual distance to each other, one after another, on a support material and are moved relative to the sensor, so that the labels are scanned successively by the sensor, the sensor comprising:
   a transmitter arranged at a distance to the labels for emitting transmission light beams which penetrate at least partially the labels and the support material;
   a receiving element, located opposite the transmitter; and
   an evaluation unit for being coupled to at least the receiving element;
   wherein the receiving element comprises at least two receivers, arranged evenly spaced one after another in a movement direction of the labels, such that a beam axis for the transmission light beams runs between the receivers, and wherein when the transmission light beams fully strike a label or the support material, the transmission light beams run between the receivers and when a portion of the transmission light beams is deflected at an edge of a label, and is conducted inside of said label, said portion strikes one of the receivers and is evaluated in the evaluation unit for detecting the edges.

2. The sensor according to claim 1, wherein the transmitter is arranged above the labels, so that the transmission light beams are guided perpendicularly onto the labels.

3. The sensor according to claim 1, wherein the transmitter comprises a laser diode.

4. The sensor according to claim 1, wherein a diameter of the transmission light beams is considerably smaller than a distance between the receivers.

5. The sensor according to claim 4, wherein the diameter of the transmission light beams is such that said beams are concentrated onto a transition region between the support material and the labels.

6. The sensor according to claim 4, wherein the receivers are spaced so that a distance between said receivers is smaller than a distance between two neighboring labels.

7. The sensor according to claim 6, wherein the receivers have a symmetrical arrangement to the beam axis for the transmission light beams.

8. A sensor according to claim 1, wherein the receiving element comprises a third receiver arranged in the beam axis for the transmission light beams and so that the support material with the labels passes between the transmitter and the third receiver.

9. The sensor according to claim 8, wherein the evaluation unit includes a teach-in key for selecting between the receiving signals from the first two receivers and the receiving signals from the third receiver for evaluation in the evaluation unit.

10. The sensor according to claim 9, wherein the first two receivers are activated and the third receiver is deactivated for detecting transparent labels.

11. The sensor according to 9, wherein the first two receivers are deactivated and the third receiver is activated in order for detecting non-transparent labels.

12. The sensor according to claim 8, wherein the evaluation unit comprises a separate comparator connected downstream after each receiver for comparing the respective receiving signals with a threshold value.

13. The sensor according to claim 12, wherein the evaluation unit includes a computer for adjusting the threshold values.

14. The sensor according to claim 12, wherein the evaluation unit includes a flip-flop and the outputs of the comparators connected to the two receivers are conducted to the flip-flop.

15. The sensor according to claim 14, wherein the evaluation unit includes first and second switches, and a teach-in key for activating one or the other of the first and second switches, wherein the output of the flip-flop is coupled to the first switch and the output of the comparator which is connected downstream of the third receiver is coupled to the second switch.

16. The sensor according to claim 1, wherein the receivers respectively comprise individual photodiodes.

17. A sensor according to claim 16, wherein the transmitter operates in a pulsed mode, and wherein the evaluation unit includes a first differential amplifier for forming a difference D between the receiving signals at the outputs of the two receivers, a second differential amplifier for forming a difference −D with a reversed sign between the receiving signals at the outputs of the two receivers, first and second amplifiers connected at the outputs, respectively, of the first and second differential amplifiers, first and second flip-flops connected in series with a respective one of the first and second amplifiers, a third flip-flop connected to the outputs of first and second flip-flops, and an exclusive-OR element having an input coupled to the output the third flip-flop.

18. A sensor for the contactless scanning of labels, which are arranged at a mutual distance to each other, one after another, on a support material and are moved relative to the sensor, so that the labels are scanned successively by the sensor, the sensor comprising:

a transmitter, arranged at a distance to the labels for emitting transmission light beams;

a receiving element having at least two receivers that are arranged in a movement direction of the labels on both sides of the transmitter and at a distance to each other; and an evaluation unit for being coupled to at least the receiving element;

wherein the receiving element is arranged so that a beam axis of the transmission light beams runs between the receivers, and wherein the transmission light beams that filly strike the label or the support material run between the receivers, and when a portion of the transmission light beams is reflected at the edge of a label and is conducted inside the label, said portion is reflected back to one of the receivers and is evaluated in the evaluation unit in order to detect the edges.

19. The sensor according to claim 18, wherein the transmitter is arranged above the labels, so that the transmission light beams are guided perpendicularly onto the labels.

20. The sensor according to claim 18, wherein the transmitter comprises a laser diode.

21. The sensor according to claim 18, wherein a diameter of the transmission light beams is considerably smaller than a distance between the receivers.

22. The sensor according to claim 21, wherein the diameter of the transmission light beams is such that said beams are concentrated onto a transition region between the support material and the labels.

23. The sensor according to claim 21, wherein the receivers are spaced so that a distance between said receivers is smaller than a distance between two neighboring labels.

24. The sensor according to claim 23, wherein the receivers have a symmetrical arrangement to the beam axis for the transmission light beams.

25. A sensor according to claim 18, wherein the receiving element comprises a third receiver arranged in the beam axis for the transmission light beams and so that the support material with the labels passes between the transmitter and the third receiver.

26. The sensor according to claim 25, wherein the evaluation unit includes a teach-in key for selecting between the receiving signals from the first two receivers and the receiving signals from the third receiver for evaluation in the evaluation unit.

27. The sensor according to claim 26, wherein the first two receivers are activated and the third receiver is deactivated for detecting transparent labels.

28. The sensor according to 26, wherein the first two receivers are deactivated and the third receiver is activated in order for detecting non-transparent labels.

29. The sensor according to claim 25, wherein the evaluation unit comprises a separate comparator connected downstream after each receiver for comparing the respective receiving signals with a threshold value.

30. The sensor according to claim 29, wherein the evaluation unit includes a computer for adjusting the threshold values.

31. The sensor according to claim 29, wherein the evaluation unit includes a flip-flop and the outputs of the comparators connected to the two receivers are conducted to the flip-flop.

32. The sensor according to claim 31, wherein the evaluation unit includes first and second switches, and a teach-in key for activating one or the other of the first and second switches, wherein the output of the flip-flop is coupled to the first switch and the output of the comparator which is connected downstream of the third receiver is coupled to the second switch.

33. The sensor according to claim 18, wherein the receivers respectively comprise individual photodiodes.

34. A sensor according to claim 33, wherein the transmitter operates in a pulsed mode, and wherein the evaluation unit includes a first differential amplifier for forming a difference D between the receiving signals at the outputs of the two receivers, a second differential amplifier for forming a difference −D with a reversed sign between the receiving signals at the outputs of the two receivers, first and second amplifiers connected at the outputs, respectively, of the first and second differential amplifiers, first and second flip-flops connected in series with a respective one of the first and second amplifiers, a third flip-flop connected to the outputs of first and second flip-flops, and an exclusive-OR element having an input coupled to the output the third flip-flop.

* * * * *